Figures 1, 2, 3, 4:
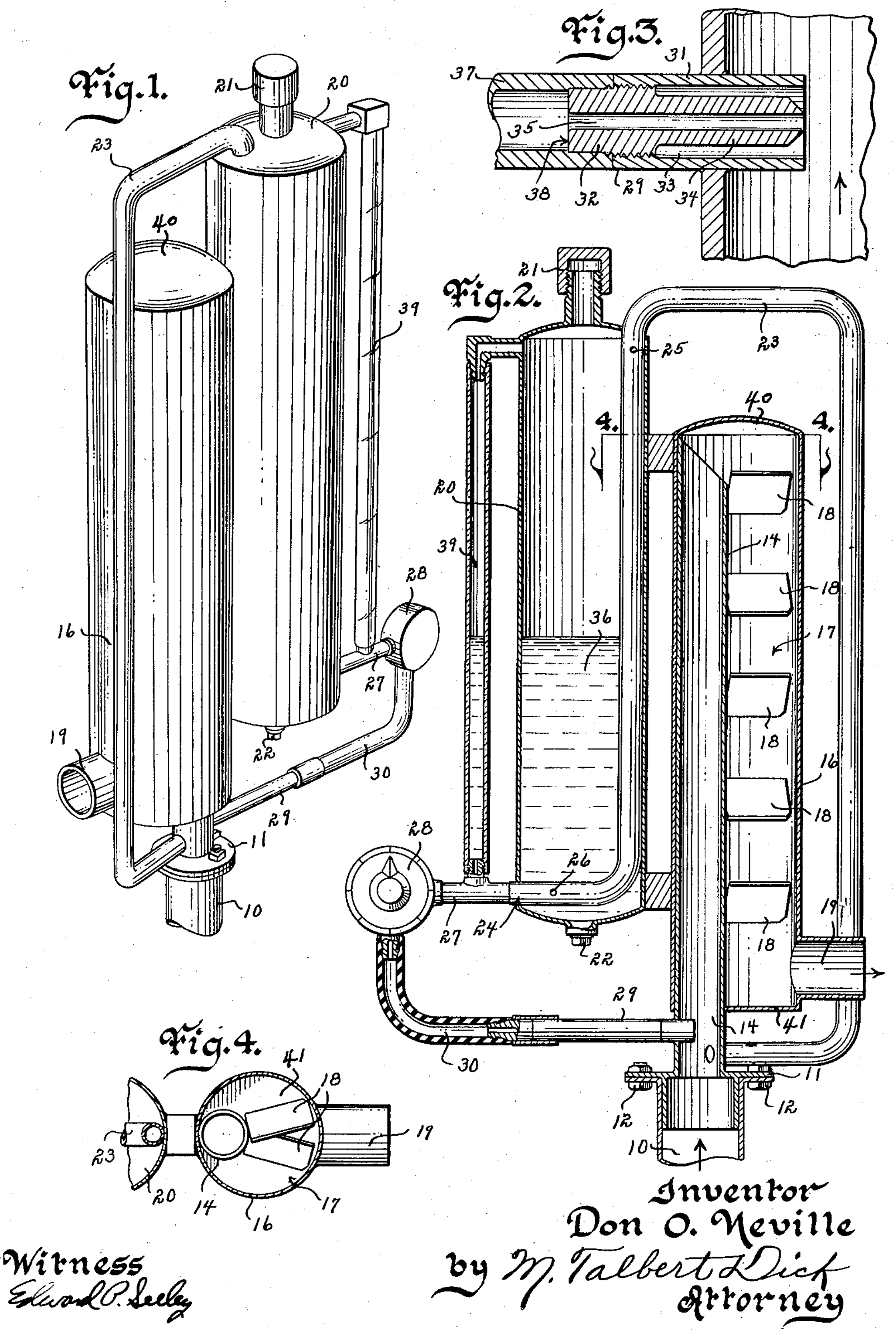

July 28, 1959 D. O. NEVILLE 2,896,855

CHEMICAL APPLICATOR FOR USE WITH
INTERNAL COMBUSTION ENGINES

Filed June 18, 1958

Inventor
Don O. Neville
by M. Talbert Dick
Attorney

Witness
Edward P. Seeley

United States Patent Office 2,896,855

Patented July 28, 1959

2,896,855

CHEMICAL APPLICATOR FOR USE WITH INTERNAL COMBUSTION ENGINES

Don O. Neville, Pocahontas, Iowa

Application June 18, 1958, Serial No. 742,820

6 Claims. (Cl. 239—129)

This invention relates to chemical applicators and more particularly to one that utilizes the hot exhaust gases of an internal combustion engine such as are found on tractors, trucks, and like motorized vehicles.

Modern successful farming demands that crops, meadows and trees must be chemically treated. Such chemicals embrace three types, i.e., insecticides for killing pests, chemicals for killing obnoxious growths, such as weeds and parasites, and chemical fertilizers. Usually the equipment for applying such chemicals is drawn and powered by and from a farm tractor. It may be in the form of a liquid spraying device, a centrifugal caster, or a powered fan means. One of the chief objections to such devices is their original cost. Also they require considerable expensive power means to operate them. Furthermore, they waste great amounts of chemicals in order to be effective.

Therefore, one of the principal objects of my invention is to provide a chemical applicator utilizing the exhaust pressure and exhaust heat of an internal combustion engine that will successfully adjustably feed the chemical through the unit under all conditions.

A further object of this invention is to provide a simple effective chemical applicator having no moving parts while in operation.

A still further object of my invention is to provide a chemical applicator that may be easily and quickly installed on or removed from the engine of a tractor or like.

A still further object of this invention is to provide a chemical applicator for use on tractors that permits the tractor to also pull and operate other agriculture implements without interference.

A still further object of my invention is to provide a chemical applicator that dries and statically electrically charges the dried particles so that they will adhere and cling to the plant life being treated.

Still further objects of my invention are to provide a chemical applicator that is economical in manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a perspective view of my device mounted on the outlet end of an exhaust pipe of an internal combustion engine, Fig. 2 is a vertical sectional view of the chemical applicator and more fully illustrates its construction, Fig. 3 is an enlarged cross sectional view of the chemical discharge nozzle portion, and Fig. 4 is a cross sectional view of the device taken on line 4—4 of Fig. 2 and more fully shows the angle baffle vanes for whirling and mixing the charge.

Farm tractors have a vertical exhaust discharge pipe 10. While I show my device mounted on such a vertical pipe, obviously it may be secured to a horizontal exhaust pipe (such as is present in a few type tractors, automobiles, trucks and like). In the drawings I have used the numeral 11 to designate a ring plate secured by any suitable means such as bolts 12, to the upper end of the exhaust pipe of the internal combustion engine (not shown). The numeral 14 designates an upwardly extending pipe connected to the plate 11. This pipe 14 has its top end cut off at an angle to incline downwardly and to the right, as shown in Fig. 2. By this arrangement of parts, the inside of the pipe 14 will be in communication with the inside of the pipe 10. The upper end portion of the pipe 14 extends into a closed elongated cylinder 16, and almost to the inside closed top 40 of the cylinder. The inside diameter of the closed cylinder 16 is considerably greater than that of the outside diameter of the pipe 14, and the pipe 14 is located eccentrically inside the cylinder in that the greatest area between the pipe and cylinder is to the right, i.e., in the direction toward which the upper cut end of the pipe 14 indicates, and is shown in Fig. 4. This larger area inside the cylinder 16 is designated by the numeral 17. Into this area 17 and extending from the side of the pipe 14 is a plurality of spaced apart baffle vanes 18 bent at an angle to the vertical and adapted to give a vortex whirling action to any hot gases passing downwardly through the cylinder. The numeral 19 designates an outlet pipe communicating with the inside bottom area 17 of the cylinder at a point near the bottom 41 of the cylinder. This outlet pipe may be of any desired length and, if desired, a flexible pipe may be secured to it to direct chemical fumes and gas or smoke exiting from the cylinder 16. The cylinder 16 is enclosed except where the pipe 14 passes through its bottom 41 and the pipe 19 exits from near its inside bottom area. The numeral 20 designates an elongated chemical supply tank secured by any suitable means in spaced relationship to the side of the cylinder 16, as shown in Fig. 1. The numeral 21 designates a detachable filling cap on the top of the tank 20. The numeral 22 designates a drain plug in the bottom of the tank 20. The numeral 23 designates a conduit having the major portion of its length extending vertically inside the tank 20 with its lower end portion 24 bent at a right angle to exit from the tank 20 near its bottom, as shown in Fig. 2. This conduit extends upwardly substantially the entire vertical length of the tank 20 and exits therefrom through the top of the tank 20. This upper end portion of the conduit 23 is then bent to extend downwardly and into the lower portion of the pipe 14. The numeral 25 designates an air hole in the upper end portion of the conduit 23 and positioned in the inside top area of the tank 20. The numeral 26 designates a chemical intake hole in the portion 24 of the conduit 23 and located near the inside bottom of the tank 20. The numeral 27 designates a short pipe having one end connected to the lower end of the conduit 23 and its other end connected to and communicating with the adjustable valve 28. The numeral 29 generally designates the horizontal chemical nozzle pipe having its forward end extending into the lower end of the pipe 14 and at a point above the point where the upper end of the pipe 23 enters the pipe 14. The numeral 30 designates a flexible conduit having one end communicating with the valve 28 and its other end communicating with the rear end of the pipe nozzle 29.

One of the chief difficulties encountered in the injecting of a chemical into a hot exhaust pipe is the congealing and crystallizing of the chemical in the nozzle due to the excessive heat of the exhaust gases. Obviously, such crystallization clogs and closes the nozzle discharge end and the unit ceases to function. Therefore, my nozzle pipe 29 is of special construction to eliminate this hazard of chemical crystallization by exhaust heat. I first weld into the lower end of the pipe 14 a stub pipe portion 31. Threaded into this pipe 31 is a nozzle jet core 32 having its forward end reduced in diameter so as to provide a space 33 between the outside of this forward end and the inside wall of the pipe 31, as shown in Fig. 3. Because of the existence of this air space 33 completely encircling the reduced portion of the core, and which I have desginated by the numeral 34, the passageway 35 of the core will be substantially cooled and furthermore the volume of metal, by being reduced as it extends to the rear end of the core 32, will reduce heat conductivity to the inflowing chemical solution 36. The rear end portion of the nozzle core 32 is of a diameter substantially that of the inside diameter of the pipe portion 31 and it is secured to the rear end pipe portion of the nozzle pipe 29, and which I have designated by the numeral 37, as shown in Fig. 3. Inasmuch as the core passageway 35 is much smaller in diameter than the inside diameter of the pipe portion 37, a shoulder dam 38 will be created back of the rear end of the nozzle core 32 and, therefore, any liquid in the pipe portion 37 must rise within the same, and be of substantial volume before it can pass through the nozzle passageway 35. The air space 33 extends beyond the outside periphery of the pipe 14 thereby further aiding in maintaining the temperature of the nozzle at a low degree of temperature insufficient to crystallize the chemical. The space back of the shoulder 38 is also substantially remote from the pipe 14 and the substantial volume of liquid chemical therein cannot be easily heated and crystallized. Therefore, due to the construction of my liquid chemical nozzle means 29, the unit will successfully operate indefinitely and free from the hazard of the fertilizer congealing or crystallizing at its exit point into the pipe 14.

Another problem was the successful uniform feeding of the chemical into the exhaust pipe 14. The reason for this was that the amount varied relative to the amount of liquid chemical in the supply tank. It also varied with the speed of the internal combustion engine and the varying pressures existing inside the pipe 14. I have overcome this problem by passing the conduit 23 through the supply tank 20, and having a chemical entrance passageway 26 near the inside bottom of the tank 20. An amount of exhaust gases will be picked up from the pipe 14 prior to their dilution by my chemical and will pass through the pipe 23 and act thereafter as the chemical carrying agent. By this arrangement the hot exhaust gases will pass upwardly through the pipe 14, some of which will enter the pipe 23, and pass by the passageway 26, picking up and carrying with it the chemical. The amount of this chemical received through the passageway 26, and the exhaust gases, is adjustably regulated by the valve 28. The exhaust gases with the chemical that are permitted to pass the valve 28 pass back into the lower end of pipe 14, through the heretofore described nozzle pipe means 29. The air passageway hole 25 equalizes pressures above the chemical 36 in the tank 20. By this arrangement of parts, the exhaust gases are partially used to pick up the chemical through the hole 26 and uniformly inject it into the lower end portion of the pipe 14, and this control will be constant and adjustably regulated by the valve 28 regardless of the volume of chemical in the tank or the speed or pull of the tractor. If desired, a visible gauge 39 may be imposed between the stub pipe 27 and the inside top of the tank 20.

To use the device the same is set on the outlet end of the exhaust pipe, as herebefore indicated. With the internal combustion engine of a tractor or like running, the major hot exhaust gases under pressure will pass through the pipe 10, thence through the pipe 14, thence downwardly through the cylinder 16, and past the baffles, and then out through the pipe 19. With the valve adjustably opened to feed the desired amount of chemical into the pipe 14, this fed chemical will be carried with the engine exhaust in its tortuous path through the device. The chemical will not only be mixed and dried in the exhaust gases but due to the heating and whirling action will be statically electrically charged so that when it is released from the conduit 19, it will fog in the form of smoke onto the plant life and will adhere and cling thereto. This static charging of the matter makes for spraying economy. The action of my device is smooth and automatic. There are no moving parts during operation and by utilizing the exhaust gases from the engine, both heat and pressure are realized without auxiliary equipment and with practically no operation costs. My device does not interfere with the function of the tractor or like and whenever it is desired to not apply a chemical it is merely necessary to close the valve and leave the device in place.

Some changes may be made in the construction and arrangement of my chemical applicator for use with internal combustion engines without departing from the real spirit and purpose of my invention, and it is my intention to cover by my claims, any modified forms of structure or use of mechanical equivalents which may be reasonably included within their scope.

I claim:

1. In a chemical applicator, a pipe having two end portions and adapted to have one end portion operatively connected to the exhaust pipe of an internal combustion engine, a cylinder having a closed top and a bottom having a pipe opening embracing said pipe; said pipe having its end portion opposite from its end portion that is adapted to be operatively connected to an exhaust pipe extending substantially the inside length of said cylinder and terminating in spaced relationship near the inside closed top of said cylinder; said pipe being eccentrically mounted in said cylinder, and having an outside diameter substantially less than that of the inside diameter of said cylinder, a chemical supply container, a conduit having both ends communicating with the inside of said pipe with its length extending through said container; said conduit having an intake passageway in that portion of its length that passes through said container, and an exit conduit leading from said cylinder, and communicating with the inside of said cylinder closely adjacent its bottom; said cylinder being closed except at points were said pipe extends through its bottom and said exit conduit communicates with its interior.

2. In a chemical applicator, a pipe having two end portions and adapted to have one end portion operatively connected to the exhaust pipe of an internal combustion engine, a cylinder having a closed top and a bottom having a pipe opening embracing said pipe; said pipe having its end portion opposite from its end portion that is adapted to be operatively connected to an exhaust pipe extending substantially the inside length of said cylinder and terminating in spaced relationship near the inside closed top of said cylinder; said pipe being eccentrically mounted in said cylinder, and having an outside diameter substantially less than that of the inside diameter of said cylinder, a chemical supply container, a conduit having one end communicating with the inside of said pipe means and its other end communicating with the inside of said pipe means at a different location with its length extending through said container; said conduit having an intake passageway communicating with the inside bottom area of said container and an air passageway communicating with the inside top area of said container.

3. In a chemical applicator, a pipe having two end portions and adapted to have one end portion operatively connected to the exhaust pipe of an internal combustion engine, a cylinder having a closed top and a bottom having a pipe opening embracing said pipe; said pipe having its end portion opposite from its end portion that is adapted to be operatively connected to an exhaust pipe extending substantially the inside length of said cylinder and terminating in spaced relationship near the inside closed top of said cylinder; said pipe being mounted in said cylinder, and having an outside diameter substantially less than that of the inside diameter of said cylinder, a chemical supply container, a conduit having one end communicating with the inside of said pipe means and its other end communicating with the inside of said pipe means at a different location with its length extending through said container; said conduit having an intake passageway communicating with the inside bottom area of said container, an air passageway communicating with the inside top area of said container, and a valve means imposed in said conduit.

4. In a chemical applicator, a pipe having two end portions and adapted to have one end portion operatively connected to the exhaust pipe of an internal combustion engine, a cylinder having a closed top and a bottom having a pipe opening embracing said pipe; said pipe having its end portion opposite from its end portion that is adapted to be operatively connected to an exhaust pipe extending substantially the inside length of said cylinder and terminating in spaced relationship near the inside closed top of said cylinder; said pipe being eccentrically mounted in said cylinder, and having an outside diameter substantially less than that of the inside diameter of said cylinder, baffles on the outer side of said pipe and inside said cylinder, a chemical supply container, a conduit having one end communicating with the inside of said pipe means and its other end communicating with the inside of said pipe means at a different location with its length extending through said container; said conduit having an intake passageway communicating with the inside bottom area of said container and an air passageway communicating with the inside top area of said container.

5. In a chemical applicator, a pipe having two end portions and adapted to have one end portion operatively connected to the exhaust pipe of an internal combustion engine, a cylinder having a closed top and a bottom having a pipe opening embracing said pipe; said pipe having its end portion opposite from its end portion that is adapted to be operatively connected to an exhaust pipe extending substantially the inside length of said cylinder and terminating in spaced relationship near the inside closed top of said cylinder; said pipe being eccentrically mounted in said cylinder, and having an outside diameter substantially less than that of the inside diameter of said cylinder, a chemical supply container, a conduit having one end communicating with the inside of said pipe means and its other end communicating with the inside of said pipe means at a different location with its length extending through said container; said conduit having an intake passageway communicating with the inside bottom area of said container and an air passageway communicating with the inside top area of said container; said pipe having its end that is inside said cylinder extending at an angle to its longitudinal length.

6. In a chemical applicator, a pipe having two end portions and adapted to have one end portion operatively connected to the exhaust pipe of an internal combustion engine, a cylinder having a closed top and a bottom having a pipe opening embracing said pipe; said pipe having its end portion opposite from its end portion that is adapted to be operatively connected to an exhaust pipe extending substantially the inside length of said cylinder and terminating in spaced relationship near the inside closed top of said cylinder; said pipe being eccentrically mounted in said cylinder, and having an outside diameter substantially less than that of the inside diameter of said cylinder, a chemical supply container, a conduit having one end communicating with the inside of said pipe means and its other end communicating with the inside of said pipe means at a different location with its length extending through said container; said conduit having an intake passageway communicating with the inside bottom area of said container, an air passageway communicating with the inside top area of said container, a nozzle core inside said conduit having a rear end, and a passageway and having its rear end of a diameter substantially that of the inside diameter of said conduit, and its passageway centrally located to provide a shoulder dam to the rear of said nozzle core.

References Cited in the file of this patent

UNITED STATES PATENTS

| | | |
|---|---|---|
| 844,745 | Rees-Gibbs | Feb. 19, 1907 |
| 1,514,106 | Savage | Nov. 4, 1924 |
| 1,729,577 | Gastell | Sept. 24, 1929 |
| 2,199,728 | Overson | May 7, 1940 |
| 2,573,982 | Ofeldt | Nov. 6, 1951 |
| 2,655,406 | Loy et al. | Oct. 13, 1953 |
| 2,675,358 | Fenley | Apr. 13, 1954 |
| 2,685,146 | Stevens | Aug. 3, 1954 |

FOREIGN PATENTS

| | | |
|---|---|---|
| 180,468 | Great Britain | June 1, 1922 |